United States Patent [19]

Kasik et al.

[11] 4,031,254

[45] * June 21, 1977

[54] INSTANT CHEESE, CHEESE SAUCES AND RELATED COMPOSITIONS

[75] Inventors: Robert L. Kasik, Berwyn; Marvin A. Peterson, Park Ridge, both of Ill.

[73] Assignee: Beatrice Foods Co., Chicago, Ill.

[ * ] Notice: The portion of the term of this patent subsequent to Nov. 4, 1992, has been disclaimed.

[22] Filed: Nov. 3, 1975

[21] Appl. No.: 628,561

Related U.S. Application Data

[63] Continuation-in-part of Ser. No. 455,510, March 27, 1974, Pat. No. 3,917,854.

[52] U.S. Cl. .............................. 426/573; 426/582; 426/585; 426/602; 426/613; 426/657
[51] Int. Cl.$^2$ ...................................... A23C 19/12
[58] Field of Search .......... 426/573, 582, 585, 602, 426/609, 613, 657, 588

[56] References Cited

UNITED STATES PATENTS

| | | | |
|---|---|---|---|
| 3,579,354 | 5/1971 | Kasik et al. | 426/582 X |
| 3,635,737 | 1/1972 | Baron | 426/582 X |
| 3,917,854 | 11/1975 | Kasik et al. | 426/573 |

Primary Examiner—Raymond N. Jones
Assistant Examiner—R. A. Yoncoskie
Attorney, Agent, or Firm—Murray and Whisenhunt

[57] ABSTRACT

A dry composition is capable of being instantly reconstituted with water to form a cheese-substitute. The composition is a mechanical mixture of co-dried particles of an alkali or alkaline earth neutralized casein and fat and an alkali or alkaline earth salt, oxide or hydroxide congealing agent. The pH of the composition is 4.5 to 6.6 and the moisture content is 10% by weight or less.

20 Claims, No Drawings

INSTANT CHEESE, CHEESE SAUCES AND RELATED COMPOSITIONS

This is a continuation-in-part of copending application Ser. No. 455,510, filed on Mar. 27, 1974 and entitled "CHEESE EXTENDER", and now U.S. Pat. No. 3,917,854.

The present invention relates to an instant cheese-substitute, to methods of producing that substitute, and to uses of that substitute, in a reconstituted form, in producing conventional cheese-flavored products.

BACKGROUND OF THE INVENTION

Natural cheese is used to flavor many prepared foods, for example, pizza, macaroni and cheese, cheese sauces, cheese dips and cheese balls. The natural cheese used for preparing such cheese-flavored foods is subject to spoilage and must be refrigerated. Even with refrigeration, the cheese must be carefully handled in order to prevent unwanted microbe growth, particularly, mold growth. For example, in home use, natural cheese is quite susceptible to mold growth once the cheese package has been opened. Even without opening the package and under proper refrigeration, conventional packaging for home-size packages are susceptible to mold growth.

Accordingly, natural cheeses must be obtained shortly before the home use in preparing cheese-flavored foods. This is not only inconvenient for the householder, but has substantially prevented pre-assembled ingredient packages for preparing cheese-flavored foods, with the exceptions where the package is either stored under frozen conditions, which is expensive and most inconvenient, or the package uses a relatively-dry or sterilized cheese composition, which often adversely affects the acceptability of the product. For example, pre-packaged ingredients for preparing pizza in the home include relatively-dry and hard Italian-type cheeses as the cheese ingredient. Such cheeses are not true pizza cheeses and they have significantly restricted the acceptability of these pre-packaged pizza ingredients.

Efforts to stabilize natural cheeses against spoilage by methods other than freezing have not met with substantial commercial success. Thus, canning, irradiating, etc., have not produced acceptable results. Also, attempts to stabilize natural cheeses against microbial growth with microbiocides have resulted in deteriorated taste, texture and cooking properties of the cheeses and have not produced satisfactory commercial results.

A substantial advance in the art is provided by the invention disclosed and claimed in the U.S. Pat. No. 3,917,854, identified above and a subsequent improvement thereon, as disclosed in U.S. Pat. No. 3,941,891, and entitled "SYNERGISTIC COMBINATION CHEESE EXTENDER". Those disclosures are incorporated herein by reference and the disclosures are relied upon. The invention in U.S. Pat. No. 3,917,854 provides a cheese-substitute composition which is a congealed mixture of magnesium and/or potassium neutralized casein, a fat having a melting point of 130° F. or less, and water. This congealed mixture mimics the texture and cooking properties of natural cheese and, which determinable selections of the ratios of the neutralized casein, water and fat, the properties of mozzarella cheese may be mimicked. Since the congealed composition is essentially bland in flavor and will not interfere with the normal taste of the pizza cheese or pizza sauce, the congealed composition may be substituted for a part of the mozzarella cheese used in producing a pizza. Further, if the congealed mixture is flavored, e.g., with a synthetic cheese flavor, then the congealed mixture may be used totally to replace mozzarella cheese in a pizza.

That composition can be provided in a dried form, e.g., spray-dried form, and can be reconstituted with water to form the congealed cheese-like mixture. It was recognized that the dry, but reconstitutable, form was a substantial improvement in the art since the dry form is storage-stable for long periods of time, even without particular storage conditions, other than normal home environments. However, the care and equipment associated with reconstitution of the dry, storage stable-mixture was beyond that which would normally be acceptable for home use.

It would, however, be desirable to provide a cheese extender or cheese substitute of that nature which can be essentially "instantly" reconsititued into the congealed mixture. This would provide a shelf-stable form of cheese-substitute for storage and home use and such cheese-substitute could be included in packaged pre-assembled ingredients for cheese-flavored foods, without the necessity of chemical stabilizing agents, or freezing, or the like.

OBJECTS OF THE INVENTION

It is, therefore, an object of the present invention to provide an "instant" cheese-substitute and/or extender which is in a dry form but which can be "instantly" reconstituted with water and without the necessity of specialized equipment or without the necessity of following unduly-restricted procedures. It is a further object of the invention to provide such a composition in combination with other pre-packaged ingredients for preparing a cheese-flavored food. It is yet anothr another to provide pre-packaged foods wherein the "cheese" ingredient is provided by the present composition. It is another object of the invention to provide a shelf and storage-stable cheese-substitute composition which can be stored in the home without special storage conditions and which can be "instantly" reconstituted with water for immediate use in preparing cheese-type foods and as a substitute for natural cheese. Lastly, it is an object of the invention to provide methods for producing such compositions and for the use thereof.

BRIEF DESCRIPTION OF THE INVENTION

The present invention is based on the discovery that dry, but reconstitutable, cheese-substitute compositions, such as those described in the aforementioned U.S. Pat. No. 3,917,854, may be made "instantly" reconstitutable by blending therewith a congealing agent. The congealing agent so improves the solvation of the dry mixture by water and the subsequent congealing thereof that the dry composition can be readily reconstituted with only normally-available kitchen mixers and without the necessity of careful procedures.

Thus, there is provided a dry composition which is capable of being "instantly" reconstituted with water to form a cheese-substitute, which composition comprises a mixture of:

1. co-dried particles containing (a) at least one alkali or alkaline earth neutralized casein, and (b) at least one fat having a melting point of 130° F. or less, the weight ratio of the neutralized casein-to-fat being from 1:2 to 2:1; and 2. a congealing amount of an alkali metal or alkaline earth metal salt, oxide or hydroxide congealing agent, and wherein the composition has a moisture content of less than 10% by weight and the composition is so adjusted in pH that the water-reconstituted pH of the composition is between 4.5 and 6.6.

While some of the benefits of the invention are obtained when all of the ingredients are mixed with a liquid carrier, e.g., water, and then dried, e.g., spray-drying, the full benefits of the invention are obtained only when the mixture is prepared by mechanically mixing previously-prepared co-dried particles of neutralized casein and fat with the congealing agent, as explained more fully hereinafter.

The mixture as described above will be essentially bland in taste and may, therefore, be used as an extender for many natural cheeses. The particular physical properties, e.g., texture, mouth feel, melting point, shredability, and the like, can be controlled by the selection of ratios within the above ranges. The mixture may be used as a total substitute for natural cheese in conventional cheese-type foods, but, in this case, it is preferred that the composition include a cheese flavor. When a synthetic cheese flavor is used, it is preferred that the cheese flavors be mechanically mixed with co-dried particles. When natural cheese is used as the cheese flavor, it should be included in the co-dried particles, since some enrobing takes place and will help to stabilize the dried natural cheese.

DETAILED DESCRIPTION OF THE INVENTION

The present invention is based upon discoveries made in connection with the dry cheese-substitute composition of the aforementioned U.S. Pat. No. 3,917,854. In carrying out experiments with those dry compositions, it was noted that certain of the formulated compositions were more easily reconstituted with water than other of the compositions. This discovery led to the investigation of certain optional ingredients in the formulations and it was found that certain of these ingredients functioned as a congealing agent and allowed simpler and easier reconstitution of the dry ingredients. Indeed, it was discovered that by proper selection of the congealing agent, the dry ingredients could be readily reconstituted in water with only a simple home-type mixer such as a conventional MIXMASTER or like ordinary kitchen home mixer. It was additionally discovered that no careful procedure need be exercised, other than using hot water and other than adding the water to the dry ingredients, rather than vice versa. These basic discoveries, therefore, provide the objects of the present invention and allow an "instant" reconstitutable, dry, cheese-substitute and/or extender.

However, in the practice of the present invention, there are constraints on the dry composition which are not necessary when the dry composition is to be reconstituted with the care and equipment available in commercial application.

Thus, the congealing agent should be mechanically mixed with the co-dried particles of neutralized casein and fat. It has been found that if the congealing agent is co-dried in the particles of neutralized casein and fat, the congealing agent does not function in the same manner as when mechanically mixed with the co-dried particles of neutralized casein and fat and most of the benefits of the present invention are not obtained.

It has also been found that further improved results and ease of reconstitution are obtained when the composition contains a gel stabilizer.

Lastly, for further improved ease of reconstitution, the dry composition should be so adjusted, either prior to or after drying, so that the reconstituted mixture (the dry powder mixed in water) will have a pH of between about 4.5 and 6.6. If the pH is substantially outside of this range and, particularly, if the pH is on the basic side, the ease of reconstitution will be substantially adversely affected. A lower pH, i.e., to about 4 or less, can be tolerated where the ease of reconstitution need not be as great, but it should be understood that at these lower pH's, the reconstitution ease decreases.

The neutralized casein is obtained by neutralizing acid casein with at least one alkali or alkaline earth metal base (or precursor thereof). However, it is preferred that the base be a magnesium, potassium, magnesium/potassium combination, sodium/potassium combination, or sodium/magnesium combination base or precursors thereof. Sodium, alone, and calcium, alone, do not provide the better properties of the present invention and are not desired embodiments of the invention.

The fat may be any relatively low melting point vegetable or animal fat, so long as the fat has essentially a bland taste and is a liquid at a temperature of less than 130° F. (melting point of less than 130° F.). Preferably, the melting point is between 20° F. and 130° F., e.g., between 40° F. and 125° F., or between 50° F. However, since some animal fats, especially butter fat, are more prone to rancidity, the preferred form of the invention is the use of vegetable fat such as derived from coconuts, soybeans, safflower, corn, cottonseed, etc.

The relative proportions of neutralized casein-to-fat, as can be appreciated, are such that the ingredients will congeal, i.e., form a gel, and provide the physical characteristics of natural cheese. These physical characteristics of natural cheese are best mimicked when the weight-to-weight ratio of neutralized casein-to-fat is between 1:3 and 3:1 and best results are obtained when this ratio is between 1:2 and 2:1. To provide stringy characteristics associated with soft cheeses, such as mozzarella cheese, that ratio should be within 1:2 and 2:1, and, especially, within 1:1.5 to 1.1:1, e.g., 1:1. The weight-to-weight ratio of water to the neutralized casein/fat combination must be within 1:2 to 3:1, especially 1.5:1 to 1:1.5, e.g., 1.25:1 to 1:1.25, and particularly 1:1.

The combination of neutralized casein and fat should comprise at least 50% of the total solids of the dry composition, preferably at least 60% to 75%, and more preferably, at least 90% to 92%. The remaining ingredients, in addition to the congealing agent (and pH adjusting agent and stabilizing agent, if necessary) can be conventional flavorings, certified food colorings, preservatives, bulking agents, etc.

The congealing agent is an alkali metal or alkaline earth metal salt, oxide or hydroxide and must be contained in the composition in a congealing effective amount. It is not understood why these salts, oxides and hydroxides function as a congealing agent. While not bound by theory, it appears that the ionic balance in the mixture of dry ingredients and water is so affected by these ionic compounds that sol formation is enhanced and subsequent gelation (or congealing) is not only improved in speed but can be accomplished over a wider range of ratio of water-to-dry-ingredients, temperature, mixing and degree and type of mixing used. The increased ease of forming a sol, and, hence, the gel, apparently allows this wider range of allowable conditions to effect efficient congealing.

It has also been discovered that the congealing agent must be mechanically mixed with the dry ingredients. In this regard, the term "mechanically" is intended to convey the restriction that the congealing agent should not be co-dried with the neutralized casein and fat, i.e., incorporated in the co-dried particles. It appears that the congealing agent must be readily dissolvable in the water and when the congealing agent is in the co-dried particles, the effectiveness of the congealing agent is sufficiently retarded in time that the advantages thereof are substantially lost. Accordingly, it can also be appreciated that the congealing agent must be freely soluble in water. In this connection, the term "freely-soluble" means that the congealing agent must be capable of being dissolved in water at a temperature of 150° F. to the extent of at least 10 grams per 100 ml of water and that total solution thereof must take place in the heated water with rapid agitation within a time period of no greater than 30 seconds. Further, solution must be in the normal ionic form, since, otherwise, the advantage of increased sol formation will not be obtained. Accordingly, ionic compounds such as salts, oxides and hydroxides, should be used.

The congealing agent must be non-toxic and not provide unwanted taste at the levels used in the composition. Any of the soluble oxides may, therefore, be used as a congealing agent and magnesium oxide is a preferred embodiment. However, the corresponding hydroxide may be used, e.g., magnesium hydroxide. Or, correspondingly, potassium hydroxide or sodium hydroxide may be used. Conveniently, salts are used, since the salts may be included in relatively large quantities without affecting the pH to the extent of bases or corresponding oxides. Chlorides of the alkali or alkaline earth metals are particularly favored, although lactates, acetates, oxylates, and the like, may be used. In the simplest form of the invention, the congealing agent may be sodium chloride and this is a preferred embodiment, bearing in mind the wide availability of sodium chloride, the low cost thereof, the high and immediate solubility, and the freedom of problems with taste and toxicity.

The amount of the congealing agent required to provide a congealing effective amount will vary considerably with the particular congealing agent involved. However, generally speaking, the congealing agent will be contained in the composition in an amount less than 10% by weight of the amount of co-dried particles of neutralized casein and fat, more often, in amounts less than 5% by weight thereof. This will insure that excess amounts of the congealing agent are not incorporated into the composition, since excess amounts could adersely affect other properties of the congealed mixture. On the other hand, the minimum amount of the congealing agent can be quite low, since, as can be appreciated, even very small amounts will improve the congealing properties of the mixture. Nevertheless, generally speaking, the congealing agent will be present in an amount equal to at least 0.1% by weight, based on the weight of the co-dried particles of neutralized casein and fat. More often, however, the amount will be at least 1% and up to 2% or 3%.

As can also be appreciated from the above, the effectiveness of the congealing agent in aiding sol formation and subsequent congealing will depend upon the pH of the reconstituting mixture, since, as is well known, sol formation is sensitive to pH. It has been discovered that in order to provide the advantages of the present invention, the reconstituting mixture should have a pH between about 4.5 and 6.6, but certainly a pH of 7 or less and 4 or more. The pH may be adjusted with any non-toxic base or acid, as required, but when using compositions having neutralized caseins within the above ratios, the pH may be inherently within this range. In any event, if the pH is not within the required range, then pH adjustment should be made. It is preferred that the base used in pH adjustment be a base corresponding to one of the alkali metal or alkaline earth metals used in either neutralizing the casein or in providing the congealing agent. Indeed, in this latter regard, selection of proper amounts of a congealing agent can also effect the required pH range.

It should be understood that the present reconstituted composition is, primarily, a congealed mixture of the defined neutralized casein, fat, congealing agent, and water. In this context, the term "congealed" is defined as a homogeneous mixture with no visibly-detectable different phases, i.e., the water, casein and fat are not in visibly, discernably different phases. Accordingly, it is clear that the term does not include a simple mechanical mixture of the ingredients, and, indeed, the reconstituted composition is best described as a gel. While not bound by theory, it appears that the present particular neutralized casein is sufficiently solvated, with the aid of the congealing agent, by the water to act as a semi-solid emulsifier for the fat and water, i.e., it is gelable. Thus, the neutralized casein used in the practice of this invention must be capable of producing a gel of the described ingredients.

It is also preferred that the composition contain a stabilizing agent. The stabilizing agent assists the congealing agent in further stabilizing the congealed form of the reconstituted cheese-substitute. Here, again, the stabilizing agent must be essentially bland in taste, water-soluble and non-toxic. The present stabilizing agent can be chosen from any of the known colloidal stabilizing agents, among which are the natural and synthetic gums, animal-derived protein, and certain milk-derived fractions. For example, guar gum, carrageen, gelatin, cellulosic gums, e.g., CMC, and edible acids, e.g., citric acid and lactic acid (or non-toxic salts thereof) may be used. A preferred stabilizer is lactic acid or a non-toxic salt thereof, since lactic acid also provides a cheese-like background flavor as well as the stablizing function. The amount of stabilizer can vary widely, and, particularly, when the stabilizer is lactic acid, amounts greater than that necessary for stabilization may be used in order to provide the cheese-like background flavor. However, generally speaking, the stabilizer may be present in amounts up to about 10% weight of the co-dried particles of neutralized casein and fat, more particularly, up to about 5% by weight. The amount of stabilizer may be from as little as 0.05% by weight but more usually it will be present in amounts of from at least 1% by weight.

The stabilizer is preferably not placed in the co-dried particles for the same reasons noted above in connection with the congealing agent but is preferably mechanically mixed with the co-dried particles in the same manner as is the congealing agent. When the stabilizing agent is not dry in its natural form, the agent should be dried to a low moisture content, i.e., less than 10% by weight of moisture. For example, when lactic acid is the congealing agent, it should be spray-dried prior to mixing with the co-dried particles of casein and fat. Spray-dried lactic acid is commercially available.

The dry composition, in the final form, should have a moisture content of less than 10% by weight, and, more preferably, less than 8%, or even as low as less than 5% by weight. This will insure storage- and shelf-stable properties and prevent any substantial deterioration of the dry composition, even without anti-microbial agents being incorporated therein.

It has also been discovered that the order of mixing the water and the dry composition for reconstitution is critical. The theoretical explanation therefor is not understood, but it is clear that the water must be added to the dry powder, while the dry powder is under mechanical agitation. This is, of course, opposite to the normal manner of mixing a dry powder and a liquid. If the dry composition is added to the agitated water, uncontrolled "balling" will occur and the product will resemble a relatively dry mixture of fat and flour, i.e., in lump or ball form, and will not provide a congealed mixture having the physical properties of natural cheese.

For reconstitution in the home, the correct amount of the dry composition is agitated at a relatively low speed with a conventional home mixer, i.e., about 200 to 800 rpm's of a conventional beater/mixer, although the particular speed is not critical and only will require either faster or slower addition of the water to the agitated powder. While the dry powder is being agitated, water, at a temperature of about 130° to 212° F., particularly, between 150° and 170° F., is slowly added. With continued agitation, e.g., about 30 seconds to 1-½ minutes, the mixture will have thick, stringy character, similar to a very stiff and elastic dough. The mixture has, at this point, substantially congealed, but further congealing will take place.

The congealed mixture is removed from the beaters and bowls of the home mixer and pressed into a loaf-shape by manually pressing the mixture. This loaf shape is then allowed to remain at rest, preferably, while being refrigerated at normal household refrigeration temperatures, e.g., 32°–62° F., for at least 10 minutes, and more preferably, at least 20 to 30 minutes. During this time, the congealing process will be completed.

The refrigerated loaf-shaped mixture will have all of the physical properties of natural cheese. It may be melted, shredded, or grated, or otherwise rendered in a state similar to the states in which natural cheese may be rendered. The cheese substitute may, as noted above, be admixed with a natural cheese and used in the same manner as a natural cheese. For example, the mixture of the cheese substitute and natural cheese may be made in admixture with a prepared food such as macaroni and cheese, pizza, cheese dip, cheese sauce, and the like.

The present cheese substitute may be used alone in preparing a food of the foregoing nature. However, in this embodiment, it is preferred that the cheese substitute have a cheese flavor incorporated therein. Conventional lypolyzed butter oil may be used to flavor the cheese substitute at levels up to about 3% by weight and this will provide sufficient cheese background flavor for many applications of the cheese substitute, particularly for use in heavily-spiced or sauced food such as pizza, and the like. The physical characteristics of the cheese substitute so mimics mozzarella cheese that the lypolyzed butter oil alone will provide an acceptable pizza product. Of course, if desired, other flavoring materials may be added to the dry composition prior to mixing with the water. For example, smoked flavors, bacon flavors, onion or garlic flavors may be added and these flavors will allow the convenient preparation of a cheese dip or cheese ball, and like appetizers. Coloring agents and the like may also be added for completing the total characteristics of natural cheese.

The physical properties of the cheese substitute, including firmness, mouth feel, shredability, and the like, may be controlled by the ratio of dry composition-to-water used in the reconstitution. With a higher proportion of dry composition-to-water, a firm wedge will be produced, similar to an aged cheddar cheese, and, indeed, with higher proportion of dry composition, some crumbling, in the manner of longaged cheddar cheese, may be obtained. On the other end of the scale, with a high proportion of water-to-dry composition, the product will remain somewhat fluid in the nature of a cheese sauce which may be used in combination with vegetables such as asparagus. Inbetween these two extremes can be produced consistencies that are similar to a fondue, cheese dip, cheese spread, cheese ball, crock cheese, wedge cheese, and even melted cheese (the latter being packable in a pressurized dispenser). Thus, the ratio of water-to-dry composition used to reconstitute the dry composition may vary widely, depending upon the particular physical properties desired. However, generally speaking, for the preferred dry compositions, the weight ratio of water-to-dry composition will normally vary between 1:2 and 1:0.4, although, preferably, this ratio will be between 1:1.5 and 1:0.5.

Further benefits of the invention may be provided by a careful selection of the neutralized casein. In the preferred embodiment, the neutralized casein is obtained by the process of copending application Ser. No. 455,551, filed on Mar. 27, 1974 and entitled "BLAND NEUTRALIZED CASEIN". While that disclosure is incorporated herein by reference, basically commercially-available acid casein is dispersed in a hot, non-toxic salt solution at temperatures at about 150° F. to 210° F. to form a coagulated curd. Any non-toxic salt may be used, but magnesium or potassium salts are preferred, e.g., a halide, nitrate, nitride, sulfide, sulfate, etc. Magnesium halide, e.g., magnesium chloride, is particularly preferred. After draining the supernate, the coagulated curd may be washed one or more times, but this is not required.

The curd may then be suspended in heated water, e.g., at about 100° F. to about 210° F., and a base is added thereto, suitably a magnesium or potassium base, or a nontoxic precursor thereof, such as an oxide. Sufficient base is added to produce a pH of between about 6.0 and 8.5. The neutralized mixture is homogenized with a high-speed stirrer, and then dried, e.g., spray-dried (for example, 290° F. to 300° F. gas inlet/170° F. air outlet), to produce the neutralized casein. The use of this neutralized casein will give quite superior results in terms of physical properties and blandness of taste of the cheese-substitute. However, magnesium/potassium neutralized caseins also give relatively bland tastes and are preferred embodiments. On the other hand, sodium neutralized casein tends to give the reconstituted composition a soapy mouth feel and calcium-neutralized casein tends to give the reconstituted composition a somewhat gritty mouth feel. These are, therefore, not preferred embodiments.

Optional ingredients such as conventional food "fillers", and "bulking agents" may also be used in the composition. Thus, conventional caseins or caseinates, e.g., acid casein, sodium caseinate, potassium caseinate, or calcium caseinate, may be used as "fillers" and "bulking agents".

The invention will be illustrated by the following examples, but it is to be understood that the invention is not limited to the specific examples but extends to the breadth described above.

EXAMPLE I

Production of a Neutralized Casein

Into a steamheated jacketed mixing tank were placed 865 pounds of water and 10 pounds of magnesium chloride. With heating and stirring, the resulting solution reached a temperature of approximately 200° F. Thereafter, with vigorous stirring, were slowly added 125 pounds of commercial acid casein on a solids basis and the mixture was stirred for approximately 3 minutes while maintaining the temperature near 200° F. The stirring was then stopped. A coagulum formed and rose to the top of the liquid, forming a curd of bread-dough-like consistency. The pH of the curd was approximately 4.5. The curd was off-white in color, and it was apparent from the appearance, consistency and taste of the curd that significant amounts of undesired components and flavors had been removed. The jacket of the tank was heated to temperatures of approximately 220° F. and the bottom outlet of the tank was opened to drain the mother liquid.

Three-hundred pounds of the curd (containing 120 pounds of casein solids) were resuspended in 300 pounds of water heated to 140° F. With stirring, the curd disintegrated into a coarse slurry.

Magnesium oxide was added to this slurry and the pH was monitored. After about ½ hour, the pH of the liquid and curd was approximately 7.0. About 1.6 pounds of magnesium oxide per 100 pounds of curd had been added to provide this pH. The slurry was then passed through a Matin-Gaulin homogenizer operated at 500 psig and spray-dried in a conventional box spray-drier with an inlet temperature of about 300° F. and an outlet temperature of about 185° F. The nozzle pressure of the spray-drier was about 1500 psig.

The resulting dried neutralized casein powder was very white in color and had essentially no taste.

An analysis of the dried neutralized casein, on a dry basis, showed the following analysis:

Protein, 94.0%
Fat, 1.25%
Ash, 4.5%
Carbohydrate, less than 0.05%.

The analysis also showed 1.25% magnesium.

Ten milliliters of a 5% solution of the product was dialyzed against one liter of a doubly deionized water for 72 hours, using a cellulose dialyzer tube (Fisher Scientific Company). This membrane retains materials with molecular weights of 12,000 and higher, and has an average pore diameter of 4.8 millimicrons. The dialyzed sample was dried under vacuum at room temperature and the quantity of magnesium was determined by atomic absorption using the Perkin-Elmer's method and showed that after dialysis, the magnesium content in the sample was only about $5 \times 10^{-3}\%$. The loss of magnesium on dialysis shows that the magnesium is not tied to the larger protein molecule, but is free to be removed by passing through the membrane.

EXAMPLE II

The cheese substitute was prepared in the following manner.

51.5 parts by weight of the neutralized casein of Example I is slurried in sufficient water to provide a solids content of about 15 to 20%. To this slurry is added 48 parts per weight of hydrogenated soybean oil (95° F. melting point) which has been priorly heated to 180° F. After mixing in of the fat, 0.5 parts of lypolyzed butter oil is added as a flavoring ingredient. The total solids in the slurry, including the fat, is about 30% by weight. The slurry is heated to a temperature between 150° F. and 160° F. and then spray-dried in a conventional box sprayer with an inlet temperature of 290° F. and an outlet temperature of between 180° F. to 190° F. The dry-powdered composition is free-flowing and has a moisture content of about 2.5%.

The dry-powdered composition is dry-blended, with mechanical agitation, with 4.2% dry-powdered lactic acid (30% solids) and 2% of sodium chloride. The resulting mixture is dry, free-flowing, and storage-stable at ambient conditions in a sealed package for periods in excess of six months.

EXAMPLE III

One part of the dry powder of Example II is placed in a home mixer (Sunbeam mixer) and, with rotation of the stainless steel bowl, the beater speed is adjusted to about 600 rpm. One part by weight of water heated to 160° to 170° F. is slowly added to the agitated dry powder and agitation is continued until the mixture begins to string in the nature of heavy dough. The mixing time, after addition of the water, is about 45 seconds. The mixer is stopped and the stringy mixture is scraped from the bowl and beaters and hand-compressed into a loaf shape. The loaf shape is essentially self-sustaining in shape, although it has a tendency to slowly flow from that shape, when stored at room temperature.

The shaped loaf is placed in a refrigerator maintained at normal temperatures, i.e., about 43° F., and, after one-half hour, the loaf has cooled sufficiently that the gelation is essentially complete and the loaf is in a shape-sustaining condition. The loaf is cut in quarters and shredded to produce a shredded cheese substitute which resembles the appearance and consistency of shredded natural mozzarella cheese. The taste is similar to mozzarella cheese and the cheese will melt and string similar to mozzarella cheese.

EXAMPLE IV

Preparation of Cheese Pizza

Traditional pizza dough was prepared by mixing flour, salt, solid vegetable shortening, scalded milk and dried yeast. The dough was allowed to raise in the conventional manner and rolled into an unbaked pizza crust. The crust was lightly brushed with olive oil and traditional pizza sauce was placed thereon. The sauce was prepared by mixing macerated tomatoes, minced garlic, minced onion, olive oil, oregano, freshly ground black pepper and red pepper flakes. Onto the pizza sauce was placed a mixture of grated mozzarella cheese and the cheese-substitute of Example III in a similar grated form. The weight ratio of the mozzarella cheese to the cheese-substitute is 1-to-1.

Thereafter, the pizza was baked at 420° F. for 20 minutes. The cheese of the baked pizza was white, of a milky translucent appearance and, when pulled, stringed in a manner essentially the same as mozzarella cheese.

As a comparison, a pizza was prepared in the same manner as described above, except that the cheese-substitute was not used, and the corresponding amount of natural mozzarella cheese was used in its place. The all-mozzarella cheese pizza could not be distinguished from the pizza with the cheese-substitute in terms of its appearance, stringiness, or other physical characteristics.

EXAMPLE V

Example IV was repeated except that the cheese-substitute was produced from casein that had been coagulated with potassium chloride and neutralized with potassium oxide according to the procedure of Example I. The pizza did not string as well as that of Example IV but the stringiness was acceptable. The taste was acceptable, but not as bland as that of Example IV.

EXAMPLE VI

Example IV was repeated except that the cheese-substitute was used entirely for the cheese of the pizza and no natural mozzarella cheese was used. The physical characteristics of the resulting pizza were essentially the same as the characteristics of the pizza made with the mixture of the natural mozzarella cheese and the cheese substitute. The flavor of the all-cheese-substitute pizza was acceptable to the taste panel, although differences in flavor could be distinguished between the all-cheese-substitute pizza and the pizza with natural mozzarella cheese. This distinction, however, was not judged to be commercially significant by the taste panel.

EXAMPLE VII

Example VI was repeated except that the reconstitution procedure of Example III was changed wherein whole milk was used instead of water. The flavor of the resulting pizza was better than that of Example VI.

Thus, instead of water there may be used reconstituted skim or whole milk solids, skim milk, whole milk cream, butter milk, etc. It is only necessary that the liquid used for reconstituting the present dry powder be principally water. Accordingly, as used in the specification and claims herein, the term "water" includes milk, milk fractions and derivatives.

In the present specification and claims, the term "co-dried" means that the casein and fat are combined in any desired manner to provide dried particles of relatively even distribution of the casein and fat in the dry particles. For example, this may be accomplished by spray drying as illustrated in Example II, above, or by so mechanically mixing dry casein and fluid fat so that the fat is absorbed into or enrobed by the casein, to provide dry, (co-dried) particles.

What is claimed is:
1. A dry composition which is capable of being instantly reconstituted with water to form a cheese-substitute, comprising a mixture of:
   1. co-dried particles containing (a) at least one base neutralized casein wherein the base is selected from the group consisting of a magnesium, potassium, magnesium/potassium, sodium/potassium and sodium/magnesium base, and (b) at least one fat having a melting point of 130° F. or less, the weight ratio of the neutralized casein to the fat being 1:3-to-3:1; and
   2. a congealing amount of an alkali metal or alkaline earth metal salt, oxide or hydroxide congealing agent; and wherein the moisture content of the composition is less than 10% by weight and the water-reconstituted pH of the composition is between 4.0 and 7.0.
2. The composition of claim 1 wherein the composition contains a stabilizing amount of lactic acid or a non-toxic salt thereof.
3. The composition of claim 2 wherein the lactic acid is in admixture with the composition.
4. The composition of claim 3 wherein the lactic acid is in a dry form.
5. The composition of claim 1 wherein the composition contains a flavor-producing amount of a cheese flavor.
6. The composition of claim 5 wherein the cheese flavor is in admixture with the composition.
7. The composition of claim 5 wherein the cheese flavor is in the co-dried particles.
8. The composition of claim 5 wherein the cheese flavor is an artificial cheese flavor.
9. The composition of claim 7 wherein the cheese flavor is natural cheese.
10. A method for instantly producing a cheese substitute comprising agitating the dry composition of claim 1, adding thereto water heated to a temperature of about at least 150° F. and continuing the agitation until the mixture congeals.
11. The method of claim 10 wherein the mixture is agitated for at least 30 seconds.
12. The method of claim 10 wherein the congealed mixture is shaped.
13. The method of claim 12 wherein the shaped mixture is refrigerated to provide further congealing of the mixture whereby shredability of the mixture is enhanced.
14. A cheese-substitute produced by the process of claim 10.
15. The cheese-substitute of claim 14 in a melted state.
16. The cheese-substitute of claim 14 in a shredded state.
17. The cheese-substitute of claim 14 in a grated state.
18. The cheese-substitute of claim 14 in admixture with natural cheese.
19. The cheese-substitute of claim 14 in admixture with a prepared food.
20. The cheese-substitute of claim 18 in admixture with a prepared food.

* * * * *